Aug. 21, 1945.　　　　E. MOREHOUSE　　　　2,383,012
SAFETY CATCH
Filed Sept. 25, 1943
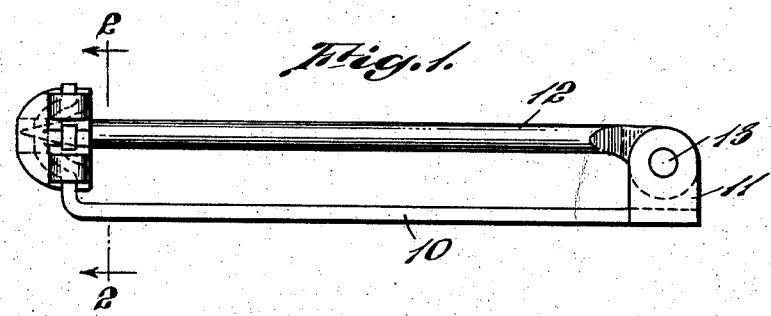
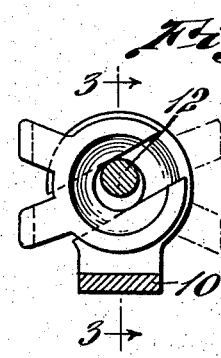
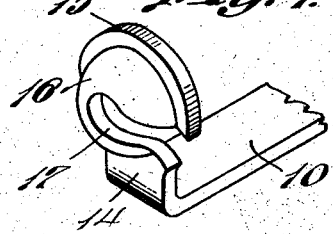
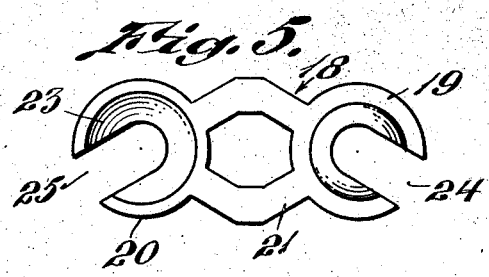
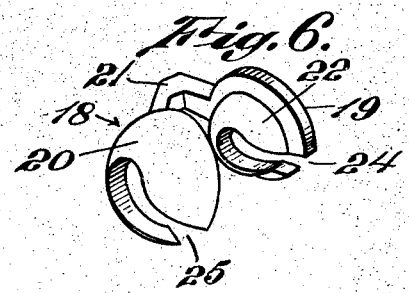
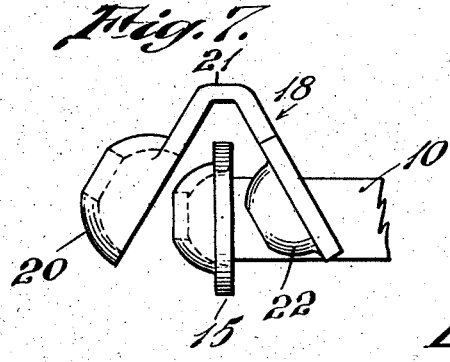
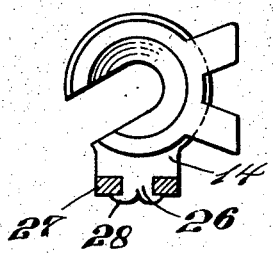
INVENTOR
Eugene Morehouse
BY Barlow & Barlow
ATTORNEYS Patented Aug. 21, 1945

2,383,012

UNITED STATES PATENT OFFICE 2,383,012

SAFETY CATCH

Eugene Morehouse, Providence, R. I., assignor to B. A. Ballou & Co. Incorporated, a corporation of Rhode Island Application September 25, 1943, Serial No. 503,787

3 Claims. (Cl. 24—157)

This invention relates to a safety catch of the type in which there is a guard suitably mounted to hold a stem in secured position.

In the construction of safety catches, it has been usual to provide two socket parts which are moved toward each other into engagement with trunnions for the rotatable mounting of two members. In some cases a member might be pierced and the other member provided with a portion which extends through the piercing to relatively rotatably mount the members. Safety catches of the character here referred to are very small and the provision of bearings and slotting of the pin stem presents some difficulties in that one part may catch upon the other where slots occur and tool operation must be accurate in small catches of this character.

One of the objects of this invention is to provide relatively large bearings with attendant beneficial result for the relative rotatable mounting of two members.

Another object of this invention is to provide by reason of this increased bearing more room for a slot to receive the pin stem.

Another object of this invention is to provide an arrangement for the relative rotatable mounting of the two members without the piercing of one of the members or the use of a pivot pin to provide the pivot.

With these and other objects in view, the invention consists of certain novel features of construction, as will be more fully described and particularly pointed out in the appended claims.

In the accompanying drawing:

Fig. 1 is a side elevation of a bar showing the pin stem and its mounting and a safety catch at one end of the bar;

Fig. 2 is a section on line 2—2 of Fig. 1;

Fig. 3 is a section on line 3—3 of Fig. 2;

Fig. 4 is a perspective view of a fragmental portion of the bar with the upturned post and the guard member omitted;

Fig. 5 is a plan view illustrating the guard member as blanked out and before being bent into U-shape form;

Fig. 6 is a perspective view showing the guard member as partially bent in U-form and before being assembled on the post;

Fig. 7 is a top plan of the bar illustrating the maner of assembling the guard on the post;

Fig. 8 is a sectional view of a modified form of post shown mounted on a separate base.

In proceeding with this invention I fold one member about another member so that it will be sandwiched between the two parts of the folded member. Deflections are provided in the stock extending over a substantial area that the portions deflected may be placed in nested relation and by reason of the concentric relation of the deflected portions the two members will be relatively rotatably mounted for movement one about the other. The deflections will more conveniently be formed before assembly of the parts one with the other.

With reference to the drawing 10 designates a sheet metal bar which may be folded up at one end to provide ears 11 between which a pin stem 12 is pivotally mounted as at 13. The other end of the bar 10 is bent upwardly as at 14 to provide a post which will have an enlarged head 15 of generally circular form. This head is deflected by suitable tools as at 16 to provide a convex portion on one side and a concave portion on the other side the surfaces of which will be portions of a sphere. A suitable slot 17 also is provided for the reception of the pin stem 12 to clasp the same with relation to the bar 10.

The guard member is designated generally 18 and is cut out of sheet stock in the shape shown in Fig. 5 to provide ears 19 and 20 connected by a bridging portion 21. This member is folded as indicated in Fig. 6 to dispose the same in generally U-shaped relation as shown in Figs. 6 and 7. Ear 19 is deformed as at 22 to provide an inwardly extending convex portion which is a portion of the surface of a sphere and so sized as to snugly fit the concavity of the post 14. Ear 20 is provided with a concave portion 23 which is a portion of the surface of a sphere and is so sized as to snugly fit the convex portion 16 of the post 14 and snugly fit therewith. When the ears are folded as in Fig. 3 the members are rotatably mounted. These two ears 19 and 20 are slotted as at 24 and 25 so as to register with the slot 17 when the member 18 is in one position of rotation while when the member is swung by reason of this pivotal mounting to a different position of rotation which may nicely occur by reason of the handle bridging portion 21 which serves to move the member from the position shown in Fig. 2 in full line to the dotted line position of Fig. 2, the slots 24, 25 then become out of registry with the slot 17 and thus serve to lock the pin stem 12 within the openings formed by the closed ends of the slots 17 on the one hand and the closed ends 24 and 25 on the other.

It will of course be apparent that a safety catch having this pivotal mounting may be provided other than on the end of a bar 10 and in Fig. 8 I have illustrated the post 14 as being provided with spurs 26 which may extend through a separate base 27 such as Celluloid and folded over as at 28 to hold the same therein. Other various bases may of course occur.

I claim:

1. In a safety catch a pair of members, one being generally U-shape providing a pair of ears and the other being sandwiched between said ears, said ears and portion sandwiched between being all deflected in the same direction along a portion of the surface of a sphere and with opposite deflected surfaces each conforming in shape to the other to rotatably mount the members while maintaining them in nested relation.

2. In a safety catch a base provided with an upstanding sheet stock post having a portion thereof deflected along the contour of a portion of a sphere to form the same concave on one side and convex on the other, and a member carried by said post provided with two ears, one on either side of the post, one ear having a concave recess to rotatably fit the convex contour of said deflected portion and the other ear having a portion of convex contour to rotatably fit into the concave contour of said deflected portion whereby said member is rotatably mounted on said post.

3. In a safety catch a base provided with an upstanding sheet stock post having a portion thereof deflected along the contour of a portion of a sphere to form the same concave on one side and convex on the other, and a sheet metal member of generally U-shape carried by said post provided with two ears, one on either side of the post, and a bridging handle portion between and connecting said ears, one ear having a concave recess to rotatably fit the convex contour of said deflected portion and the other ear having a portion of convex contour to rotatably fit into the concave contour of said deflected portion whereby said member is rotatably mounted on said post.

EUGENE MOREHOUSE.